(12) United States Patent
Kane et al.

(10) Patent No.: US 7,934,986 B2
(45) Date of Patent: May 3, 2011

(54) METHOD AND APPARATUS FOR REDEEMING KENO TICKETS

(75) Inventors: Steven N. Kane, Brookline, MA (US); Dow Hardy, Marlborough, MA (US); Mark E. Herrmann, Wellesley, MA (US); Paul LaRocca, Westport, CT (US); Bijan Sabet, Sudbury, MA (US); Jason Yanowitz, Amherst, MA (US)

(73) Assignee: GameLogic, Inc., Walltham, MA (US)

( * ) Notice: Subject to any disclaimer, the term of this patent is extended or adjusted under 35 U.S.C. 154(b) by 1115 days.

(21) Appl. No.: 11/339,327

(22) Filed: Jan. 25, 2006

(65) Prior Publication Data

US 2006/0178197 A1  Aug. 10, 2006

Related U.S. Application Data

(60) Provisional application No. 60/646,799, filed on Jan. 25, 2005.

(51) Int. Cl.
*A63F 13/00* (2006.01)

(52) U.S. Cl. ........... 463/18; 463/40; 463/41; 463/42; 705/14.1; 705/14.23; 705/14.35; 705/14.38

(58) Field of Classification Search ............ 463/18, 463/42; 705/14
See application file for complete search history.

(56) References Cited

U.S. PATENT DOCUMENTS

| 4,582,324 A | 4/1986 | Koza et al. |
|---|---|---|
| 4,679,789 A | 7/1987 | Okada |
| 4,725,079 A | 2/1988 | Koza et al. |
| 4,764,666 A | 8/1988 | Bergeron |
| 4,882,473 A | 11/1989 | Bergeron et al. |
| 5,158,293 A | 10/1992 | Mullins |
| 5,216,595 A * | 6/1993 | Protheroe ............ 463/42 |
| 5,377,975 A | 1/1995 | Clapper, Jr. |
| 5,569,082 A | 10/1996 | Kaye |
| 5,586,937 A | 12/1996 | Menashe |
| 5,628,684 A | 5/1997 | Bouedec |
| 5,645,485 A | 7/1997 | Clapper, Jr. |
| 5,653,635 A | 8/1997 | Breeding |
| 5,709,603 A | 1/1998 | Kaye |
| 5,722,891 A | 3/1998 | Inoue |
| 5,749,784 A | 5/1998 | Clapper, Jr. |
| 5,768,382 A | 6/1998 | Schneier et al. |
| 5,772,511 A | 6/1998 | Smeltzer |
| 5,788,573 A | 8/1998 | Baerlocher et al. |
| 5,791,990 A | 8/1998 | Schroeder et al. |
| 5,810,664 A | 9/1998 | Clapper, Jr. |
| 5,823,873 A | 10/1998 | Moody |
| 5,823,874 A | 10/1998 | Adams |
| 5,848,932 A | 12/1998 | Adams |

(Continued)

FOREIGN PATENT DOCUMENTS

WO  WO 03040909 A2 *  5/2003

*Primary Examiner* — Ronald Laneau
*Assistant Examiner* — Justin Myhr
(74) *Attorney, Agent, or Firm* — Dority & Manning, P.A.

(57) ABSTRACT

A method and apparatus is provide for playing keno-type games wherein a player can redeem a winning ticket remotely (e.g., over the Internet, by email or phone, etc.) instead of having to return to a point of purchase of the ticket to redeem the ticket. The keno-type game can be played using paper tickets or on a computer system, for example, coupled to the Internet.

14 Claims, 6 Drawing Sheets

U.S. PATENT DOCUMENTS

| | | | |
|---|---|---|---|
| 5,860,653 | A | 1/1999 | Jacobs |
| 5,871,398 | A | 2/1999 | Schneier et al. |
| 5,882,258 | A | 3/1999 | Kelly et al. |
| 5,887,906 | A | 3/1999 | Sultan |
| 6,012,983 | A | 1/2000 | Walker et al. |
| 6,044,135 | A | 3/2000 | Katz |
| 6,059,289 | A | 5/2000 | Vancura |
| 6,077,163 | A | 6/2000 | Walker et al. |
| 6,110,044 | A * | 8/2000 | Stern ................................ 463/29 |
| 6,146,272 | A | 11/2000 | Walker et al. |
| 6,152,823 | A | 11/2000 | Lacoste et al. |
| 6,159,097 | A | 12/2000 | Gura |
| 6,162,121 | A | 12/2000 | Morro et al. |
| 6,179,711 | B1 | 1/2001 | Yoseloff |
| 6,186,892 | B1 | 2/2001 | Frank et al. |
| 6,203,427 | B1 | 3/2001 | Walker et al. |
| 6,236,900 | B1 | 5/2001 | Geiger |
| 6,251,017 | B1 | 6/2001 | Leason et al. |
| 6,311,976 | B1 | 11/2001 | Yoseloff et al. |
| 6,312,334 | B1 | 11/2001 | Yoseloff |
| 6,358,151 | B1 | 3/2002 | Enzminger et al. |
| 6,364,765 | B1 | 4/2002 | Walker et al. |
| 6,368,214 | B1 | 4/2002 | Luciano |
| 6,368,218 | B2 | 4/2002 | Angell, Jr. |
| 6,375,567 | B1 | 4/2002 | Acres |
| 6,394,902 | B1 | 5/2002 | Glavich et al. |
| 6,402,614 | B1 | 6/2002 | Schneier et al. |
| 6,471,208 | B2 | 10/2002 | Yoseloff et al. |
| 6,488,280 | B1 | 12/2002 | Katz et al. |
| 6,514,144 | B2 | 2/2003 | Riendeau et al. |
| 6,523,829 | B1 | 2/2003 | Walker et al. |
| 6,540,230 | B1 | 4/2003 | Walker et al. |
| 6,565,084 | B1 | 5/2003 | Katz et al. |
| 6,572,107 | B1 | 6/2003 | Walker et al. |
| 6,582,307 | B2 | 6/2003 | Webb |
| 6,588,747 | B1 | 7/2003 | Seelig |
| 6,607,439 | B2 | 8/2003 | Schneier et al. |
| 6,612,501 | B1 | 9/2003 | Woll et al. |
| 6,612,574 | B1 | 9/2003 | Cole et al. |
| 6,619,660 | B2 | 9/2003 | Schaefer et al. |
| 6,645,074 | B2 | 11/2003 | Thomas et al. |
| 6,656,042 | B2 | 12/2003 | Reiss et al. |
| 6,663,105 | B1 | 12/2003 | Sullivan et al. |
| 6,676,126 | B1 | 1/2004 | Walker et al. |
| 6,679,497 | B2 | 1/2004 | Walker et al. |
| 6,681,995 | B2 | 1/2004 | Sukeda et al. |
| 6,682,419 | B2 | 1/2004 | Webb et al. |
| D486,869 | S | 2/2004 | Webb et al. |
| 6,685,561 | B2 | 2/2004 | Anderson et al. |
| 6,692,353 | B2 | 2/2004 | Walker et al. |
| 6,716,103 | B1 | 4/2004 | Eck et al. |
| 6,719,631 | B1 | 4/2004 | Tulley et al. |
| 6,729,956 | B2 | 5/2004 | Wolf et al. |
| 6,733,385 | B1 | 5/2004 | Enzminger et al. |
| 6,749,198 | B2 | 6/2004 | Katz et al. |
| 6,843,724 | B2 | 1/2005 | Walker et al. |
| 2002/0052229 | A1 | 5/2002 | Halliburton et al. |
| 2002/0061778 | A1 | 5/2002 | Acres |
| 2002/0090986 | A1 | 7/2002 | Cote et al. |
| 2002/0098882 | A1 | 7/2002 | Lind et al. |
| 2002/0155885 | A1 | 10/2002 | Shvili |
| 2002/0169018 | A1 | 11/2002 | Schneier et al. |
| 2002/0187827 | A1 | 12/2002 | Blankstein |
| 2002/0193158 | A1 | 12/2002 | Weiss et al. |
| 2002/0198038 | A1 | 12/2002 | Adams |
| 2003/0027628 | A1 | 2/2003 | Luciano |
| 2003/0045340 | A1 | 3/2003 | Roberts |
| 2003/0060257 | A1 | 3/2003 | Katz et al. |
| 2003/0060261 | A1 | 3/2003 | Katz et al. |
| 2003/0069068 | A1 | 4/2003 | Kaminkow |
| 2003/0080508 | A1 | 5/2003 | Thibault |
| 2003/0083934 | A1 * | 5/2003 | Fostick et al. ................... 705/14 |
| 2003/0102625 | A1 | 6/2003 | Katz et al. |
| 2003/0139214 | A1 | 7/2003 | Wolf et al. |
| 2003/0176212 | A1 | 9/2003 | Schlottmann et al. |
| 2003/0186739 | A1 | 10/2003 | Paulsen et al. |
| 2003/0195841 | A1 | 10/2003 | Ginsberg et al. |
| 2004/0036212 | A1 | 2/2004 | Walker et al. |
| 2004/0038723 | A1 | 2/2004 | Schneier et al. |
| 2004/0051240 | A1 | 3/2004 | Adams |
| 2004/0053683 | A1 | 3/2004 | Hartl et al. |
| 2004/0102238 | A1 | 5/2004 | Taylor |
| 2004/0116185 | A1 * | 6/2004 | George et al. ................... 463/42 |
| 2004/0127277 | A1 * | 7/2004 | Walker et al. ................... 463/16 |
| 2004/0127279 | A1 | 7/2004 | Gatto et al. |
| 2004/0133472 | A1 | 7/2004 | Leason et al. |
| 2004/0193489 | A1 * | 9/2004 | Boyd et al. ....................... 705/14 |

\* cited by examiner

METHOD AND APPARATUS FOR REDEEMING KENO TICKETS

RELATED APPLICATIONS

This application claims priority under 35 U.S.C. §119(e) to U.S. Provisional Application Ser. No. 60/646,799, entitled "METHOD AND APPARATUS FOR REDEEMING KENO TICKETS," filed on Jan. 25, 2005. This application is herein incorporated by reference in its entirety.

FIELD OF THE INVENTION

The present invention relates generally to the game of keno and, more particularly, to methods of and systems for redeeming keno tickets.

DESCRIPTION OF THE RELATED ART

Keno is one type of legalized public and private games common in the United States and throughout the world. Keno-type games typically draw numerous (e.g., 15 to 20) random winning numbers from a larger population of numbers, e.g., integers from 1 to 80. Indeed, keno-type games typically select more winning numbers from the population of numbers than are required to win.

For example, to play keno, a player may select a minimum of four and no more than 10 numbers between 1 and 80. Each selection is called a "spot," so if one selects ten numbers, the player is said to be playing a ten spot game. The player marks a blank keno card with the selected numbers, hands in the ticket (e.g., to a clerk at a casino, as discussed further below) and receives a duplicate ticket in return. Typically, about twenty winning numbers are selected from the population of numbers and game participants may win a prize if they match anywhere between zero and ten of the winning numbers. Thus, a game participant still can win the top prize without having to match all, or even any, of the winning numbers drawn. Keno-type games typically produce numerous opportunities to match winning numbers and thus many opportunities to win.

Moreover, keno-type games are flexible because game participants can choose how many winning numbers they would like to try to match in each game. For example, participants may select two, three, or other quantity of numbers up to ten. Correspondingly, prizes (e.g., cash jackpots) are greater when more numbers are matched. Keno prizes generally increase correspondingly with the odds of matching all player chosen numbers. For example, the prize for matching five out of five player chosen numbers may be five times greater than the prize for matching two out of two player chosen numbers.

Keno is typically played in casinos and state lotteries. Casinos sell keno tickets to players, for example, at special counters or through wandering keno ticket sellers. A player can play more than one keno session on a ticket, and need not be present in the casino while the keno sessions are being run. The player can return to the casino to see if he or she won any sessions. If the player has won, a keno ticket can be redeemed for winnings in the casino. Keno tickets may, in some circumstances, be redeemed via regular mail. Keno games run by state lotteries sell and redeem tickets in a similar manner to casinos, with specified lottery sales locations (e.g. bars and restaurants) replacing the special keno ticket counters. Keno tickets can also be redeemed at these points of sale (POS).

SUMMARY OF THE INVENTION

According to one aspect of the present invention, it is realized that there is a need for an alternative method for redeeming winning keno tickets that are purchased at a Point of Sale. To this end, a system and method is provided for allowing a player to redeem a winning ticket (e.g., a keno ticket) remotely instead of having to return to a point of purchase or sale of the ticket to redeem the ticket. For example, it would be more convenient if the player could redeem the ticket electronically, such as over the Internet, by email, phone, or other remote method, rather than return to the POS, such as a casino or other land-based location that allows the sale and redemption of keno tickets. Such a keno-type game can be played, for example, using paper tickets, either alone or in combination with a computer system, for example, over the Internet.

According to another aspect of the present invention, it is appreciated that there is an additional benefit provided to game operators of keno games for permitting players to redeem tickets electronically. Specifically, there it is appreciated that there is a difference in tax charged to the operator (e.g., a casino) between keno games that permit different redemption periods after purchase of a ticket. In one example, the operator may be charged less federal tax for a shorter redemption period (e.g., 24 hours) versus a longer redemption period (e.g., 90 days). For instance, the operator may be charged a lower percentage of the handle by having a shorter redemption period. By permitting players to redeem electronically, the game operator may be able to reduce tax by allowing a shorter redemption period. Traditionally, keno redemption is limited to methods that require longer redemption periods (e.g., by allowing the player to return to a casino to redeem or by permitting the player to redeem winning keno tickets via regular mail). In this way, the game operator may minimize tax consequences by offering shorter redemption periods.

According to one aspect of the present invention, a method is provided for redeeming a winning keno ticket purchased at a Point of Sale (POS), wherein the winning keno ticket is redeemed by electronic communication between the player and the gaming operator. In one embodiment of the invention, the electronic communication is performed over the Internet. According to another embodiment, the electronic communication is performed using e-mail. According to another embodiment, the electronic communication is performed using instant messaging on the Internet. According to another embodiment, the electronic communication is performed using text messaging.

According to another embodiment, the game operator is a land-based casino. According to another embodiment, the game operator is one of a state lottery and a national lottery.

According to another aspect of the present invention, a keno game having a plurality of tickets purchased by a plurality of players at a Point of Sale (POS) is provided comprising at least one winning ticket of the plurality of tickets, and an electronic communication means for a player to redeem the winning ticket. According to one embodiment, the electronic communication means is over the Internet. According to another embodiment, the electronic communication means is by e-mail. According to another embodiment, the electronic communication is by instant messaging on the Internet. According to another embodiment, the electronic communication is by text messaging. According to another embodiment, the game operator is a land-based casino. According to another embodiment, the game operator is at least one of a state and a national lottery.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION OF THE INVENTION

Various aspects of the present invention relate to new methods for redeeming winning keno tickets. Existing methods for redeeming winning keno tickets require that the player return the casino or state lottery agent to have the ticket and the win verified and to obtain any payout. However, disadvantages of this redemption method include the following:

A player may purchase to play multiple consecutive keno game sessions and does not need to be present to win. Thus, a player may be located away from the betting establishment, and it may be inconvenient for the player to physically return to the betting establishment to redeem the ticket. For instance, the player may be off-site or many kilometers away from the casino when the game sessions have concluded and it may be inconvenient (or even costly) for the player to return to redeem the winning ticket.

The inconvenience or cost to redeem a winning keno ticket may reduce the number of game sessions a player decides to play, which could decrease the amount of money a player may spend in a casino.

Thus, according to one aspect a more convenient way is provided for redeeming a keno ticket. In one embodiment of the present invention, a player may redeem a keno ticket using a computer system operated by the player, the computer system being located outside the betting establishment. In one embodiment, the computer system may be coupled to the gaming establishment (or other legal jurisdiction) through a communication network such as the Internet. According to another embodiment of the present invention, a player may redeem a keno ticket using e-mail or other electronic communication means.

After the player has purchased one or more keno game sessions the gaming operator may conduct one or more keno game sessions. According to one embodiment, the player may be permitted to view the game sessions proceeding at the betting establishment from a location outside of the betting establishment. After one of the keno sessions has concluded, the player may redeem his/her winnings associated with the particular keno session. To this end, the player may be permitted to redeem his/her keno entry using a computer coupled to a computer system of the operator through a communication network (e.g., including the Internet).

The player may be presented, by the computer system, an interface used to redeem keno tickets. The interface may be, for example, the same or similar interface used to view keno results. The interface may permit, for example, the player to enter information relating to a ticket to be redeemed. For instance, the player may enter an identifier of a ticket to be redeemed. Further, the interface may include a control, that, when activate by the player, to permit the ticket to be redeemed.

Further, the winnings may be caused as a result of the redemption to be transferred to the player. For instance, the player may be paid by transferring the winnings to a player's account (e.g., a bank account, credit line, etc.). The account information may be provided to the operator, for example, by the player at the POS.

Alternatively, the player may provide account information to the operator in an interface of a computer system used to redeem keno tickets. The interface may be, for example, a web-based or other type of computer-based interface that permits a player operating a computer system to redeem keno tickets. To this end, the computer system may be coupled to a keno system through a communication network (e.g., including the Internet), and may have the capability to transfer control information to the keno system to cause a ticket to be redeemed. In particular, the player may be permitted to enter ticket redemption information in the computer system, and the information is transferred electronically to the keno system. The computer system and keno system may communicate redemption information using one or more communication protocols (e.g., the Transmission Control Protocol (TCP), User Datagram Protocol (UDP), etc.).

Once received at the keno system, the keno system may transfer the winnings to the player (e.g., by transferring funds to an account). The redemption information may include any number of information elements, including, but not limited to, an identifier of the ticket, security information associated with the win results and/or ticket, or any other verifying information.

Such redemption information may be provided to the keno system using other methods. For instance, the player may be capable of redeeming tickets via an e-mail method. For instance, the player may provide ticket identifying information in an e-mail message, the receipt of which causes the keno system to redeem the ticket and provide the player with any winnings. Similarly, the keno system may include other interfaces that permit the player to remotely redeem keno tickets. For example, the keno system may include an instant messaging (IM) interface as is known in the art, and can be initiated by a player operating a computer system or any other type of system capable of performing instant messaging. Further, the keno system may have a text messaging interface that is capable of receiving a text message (e.g., from a cellular phone via a cellular communication network) that causes a particular keno ticket to be redeemed.

According to one aspect of the present invention, a player may subscribe to multiple keno games using a conventional keno ticket as is known in the art. A typical keno ticket shows all the possible elements in a grid or pattern with the elements a player has chosen being highlighted or otherwise differentiated from the elements that have not been chosen. The typical keno ticket also indicates the keno game sessions that the player is playing and may also indicate when the last game session ends.

Prior to playing a keno game session, a game player may need to pay for playing. For example, a game player may pay using money or loyalty points. In particular, a game player may pay using money by debit card, credit card, check, cash or account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels, or frequent visitor programs for casinos. The game player may pay in person using a cashier (e.g., at a casino or a state lottery agent).

In one embodiment of the invention, players may subscribe to play multiple consecutive keno game sessions. That is, the player pays at one time to play many consecutive game sessions. The player may also choose to have his or her subscription automatically renewed.

According to one embodiment of the invention, players may also enter to play keno using an alternative method of entry (AMOE). AMOE is a required available method of entry into a sweepstakes that does not require a purchase. Sweepstakes are usually used as a promotional or marketing tool. Any company or organization offering a sweepstakes ticket in exchange for a purchase is typically required to also offer an AMOE to the sweepstakes that is not linked to a purchase.

A common AMOE method includes sending, by an individual interested in entering the sweepstakes, to the sweepstakes offeror a postcard with his or her name, address, or other contact information. Another AMOE method includes requiring an individual to sign to a free Internet website and submitting the required information for free. Numerous other methods may be used for performing an AMOE. Most sweepstakes limit the number of times one individual or family may enter a sweepstakes by AMOE.

According to one embodiment of the invention, it is realized that an AMOE (alternative method of entry) may be used to enter a game of skill or chance. More particularly, it is possible to develop, implement and run wagering games of skill or chance, including the inventive games described herein, with an AMOE method of entry. AMOE methods are conventionally used to enter a player in a sweepstakes, which is not considered wagering or gambling. Thus, according to one embodiment of the invention, an individual may enter a wagering game of skill or chance by AMOE using, for example, the postcard or the online method outlined above. The wagering game of skill or chance player entering by AMOE may also have the same odds to win the payout associated with the game in which they are entered. The wagering game of skill or chance player entering by AMOE may also be limited to a small number of game sessions within a given period of time; for example a player entering by AMOE may be limited to entering one game session in one year or two game sessions in one month. Other numbers of games and given periods may be any number, and the invention is not limited to any particular implementation.

An individual entering a sweepstakes by AMOE is required by law to have the same odds of winning each of the available prizes as do individuals who have paid for entry (e.g., by making a purchase of a product or service).

According to one embodiment of the invention, it is realized that an AMOE (alternative method of entry) may be used to enter a keno game session. More particularly, it is possible to develop, implement and run keno games with an AMOE method of entry as is usually associated with sweepstakes. An individual may enter the keno game session by AMOE using the postcard or the online methods outlined above. The keno game player entering by AMOE has the same odds to win the payout associated with the game session in which they are entered as do any other players who have paid for entry. The keno game player entering by AMOE may also be limited to a small number of game sessions within a given period of time. For example, the player may be limited to entering one game session in one year or two game sessions in one month. Other numbers of sessions and given periods may be any number, and the invention is not limited to any particular implementation.

According to one embodiment, the game session that the game player entering by AMOE is entered into may be determined by the game player on the AMOE entry form. For example, the post card AMOE may be required to state the date and the time of the game session that the game player wants to enter. Alternatively, the game session entered may be the next starting game session after the AMOE is received and logged. As another alternative, AMOE entries may be assigned to a specific game session(s) each hour, day, week, or other time interval.

According to one embodiment, a keno game session has a predetermined payout table associated with it. The payout table may have a listing of the ways to obtain a payout and its payout amount. Possible ways to obtain a payout include matching all, some, or none of the player chosen elements with the randomly chosen winning elements for a specific keno game session. The payout amount for each way to win may depend upon but may not be rigidly determined by the odds of obtaining the particular way to obtain a payout in the predetermined fixed number of drawn winning elements; for example, the odds of matching ten player chosen elements with twenty winning elements drawn may be twice that for twenty player chosen elements, but the payout may be only one and one half times higher for matching the twenty player elements chosen versus ten player chosen elements.

The payout table may also have adjustments for a player's subscription. For instance, the payout may increase if the player has a multiple game session subscription or high payment per game session. The payout may also be adjusted for numerous other criterion including frequent player credits. Of course, all payout adjustments must meet any legal requirements for the gaming jurisdiction in which the game is played.

The payout table for each game session may also be supplemented by a jackpot that transfers from game session to game session. These types of jackpots are commonly called rolling or progressive jackpots. A rolling jackpot may be the same amount that transfers from game session to game session until it is paid out. A progressive jackpot is a rolling jackpot that increases as more game sessions, game cards, or other criterion are played. Rolling or progressive jackpots are typically paid out for a difficult way to match the player chosen elements with the drawn winning elements of a game session, e.g. matching twenty player chosen elements with twenty drawn winning elements.

The final payout may also be affected as to whether the game session has a fixed payout for a win or whether the payout is shared. If the payout is fixed for a win, all players that have a game session winner for a certain type of win may be paid the amount listed in the payout table for the win. According to one embodiment, each player is playing solely against the game operator. According to another example, if the payout is shared, then all players that have a game session winner for a certain type of win may be paid a total of the amount listed in the payout table. Each player may receive a share of the total payout depending upon how much he or she paid for the game or any other legal criteria.

The final payout may also be affected by bonus play. Bonus play is well known in the gaming industry and works to increase some payouts by offering the chance to multiply a payout.

One or more sessions may proceed concurrently; the parameters of the concurrent game sessions may be the same, similar, or different. For example, the drawn winning elements may be used for one or more concurrent sessions if the predetermined set of elements is the same for the one or more concurrent sessions.

One or more game sessions may proceed concurrently. Parameters of concurrent game sessions may be the same, similar, or different. Additionally, game sessions may run continually, i.e. one after another. When one game session ends, another game session may begin immediately or in a short period of time. Game sessions may follow a precise time schedule so that players know when games will begin. For example, if game play in a game session requires four and a half (4.5) minutes to complete, then the next game session may start immediately or in a defined period (e.g., thirty seconds) to maintain to a schedule of game sessions. For instance, game sessions may begin every five minutes (e.g., at :00, :05, :10, :15, :20, :25, :30, :35, :40, :45, :50, :55 of each hour). Because, according to one embodiment, game sessions may run continually, it may be possible that a particular game session may have no game player playing within the particular game session.

Prior to a game session, the game player may choose from the predetermined set of elements for a particular game session. A game player may choose the elements for trying to match the drawn winning elements for a game session manually or using a computer system. Alternatively, according to one embodiment of the invention, a computer system may automatically choose the player chosen elements for a game player. Because a computer system can both choose the player chosen elements and draw the winning elements, a player need not configure and attend each game playing session, as discussed further below.

The predetermined set of elements may be any letter or character, number, symbol, color, logo, shape, drawing or other item that may be represented. The element may be a letter or character of any one or more languages including, but not limited to, English, Russian, Japanese, Chinese or Greek. The element may also be any random combination of letters or characters including words and phrases. The element may also be a number of any language including, but not limited to, English, Chinese or Roman, and the number may be represented by items. For example, the number of stars in the cell or the dots on the face of a die or dice. The number may be negative, zero, positive, integer, fraction, decimal, real or imaginary, and in one example, the number is preferably a positive integer. The element may also be a symbol from anywhere, such as, for example, astrology, religion, printing and computer fonts, road signs, or law. The element may be any color including, but not limited to, black, white or shades of gray. The element may also be a logo of a company or product name or trademark.

The winning elements for a game session may be randomly drawn by hand or by computer system from the predetermined set of elements for the game session. When the drawing is by hand, the winning elements may be chosen from pieces of paper drawn out of a hat or drum, by using balls or discs in a rotating or air blown sphere, or any other method that can be used for drawing elements for a keno-type game. The hand-drawn winning elements may then be displayed or entered into a computer system. In one preferred embodiment, the winning element(s) is randomly drawn by computer system from the predetermined set of elements for a particular game session.

The game player may view the game proceedings using television, wireless or line telephone with display, handheld device, kiosk, computer or in person; depending upon the viewing medium, it may be necessary to download game information prior to viewing while other viewing medium may allow viewing of the streamed game information. For example, the game player may operate a computer system that has an Internet-enabled interface (e.g., using Macromedia Flash or Java) and the computer system may display streamed game information within that interface.

According to one embodiment, a player may purchase one or more keno tickets from a vendor as described above. After all the drawn winning elements are drawn for a game session, a player may check the ticket for a winning number of matching elements and then inform the game operator that the keno ticket is a winner. If the game player is playing the game remotely, for instance over the web or interactive television, or if the game operator is a computer system, then the player may use e-mail, instant messaging, or other electronic or voice indication method (e.g., the telephone) to notify the game operator of the winning keno ticket. The game operator would then authenticate and verify the game player and the winning keno ticket. The game operator would then verify that the game player won by checking the keno ticket against the drawn winning elements for the appropriate game sessions. Methods for ticket verification are well known in the remote and electronic gaming industry.

As stated above, it may also be possible that a game card may be a winner because of not matching the drawn winning elements. For example, in a game session with forty drawn winning elements out of a predetermined set of elements containing seventy-five items, a keno ticket that has no matches in a specific game session may have a payout equivalent to a keno ticket matching ten out of ten player chosen elements to the forty drawn winning elements.

During the period of time between the game sessions, a game operator may make announcements, rest, or any number of actions. If the game is played using a computer system, then advertisements, sponsorships, public service announcements or any visual or auditory content may be inserted. The advertisements, etc. may also be inserted into the game display during a game session.

A game player may also be able to replay or review a past game session using a video device including kiosk, telephone with display, television, computer or handheld device. By accessing the proper game session in the computer system, a game player may be able to see a past game session as it occurred, the winning tickets and winning game player identity(ies), the drawn winning elements, or possibly any other aspect of the game session of interest.

According to another embodiment of the invention, the game, its game sessions, and the game play are partially or fully operated using one or more computer systems. A computer system may be a single computer that may be a supercomputer, minicomputer or a mainframe or personal computer. A computer system may also be any multiple and combination of computer types that work together; multiple computer systems may also be needed to run the whole game. The computer system also may include input or output devices, displays, and/or storage units.

Figure 3:
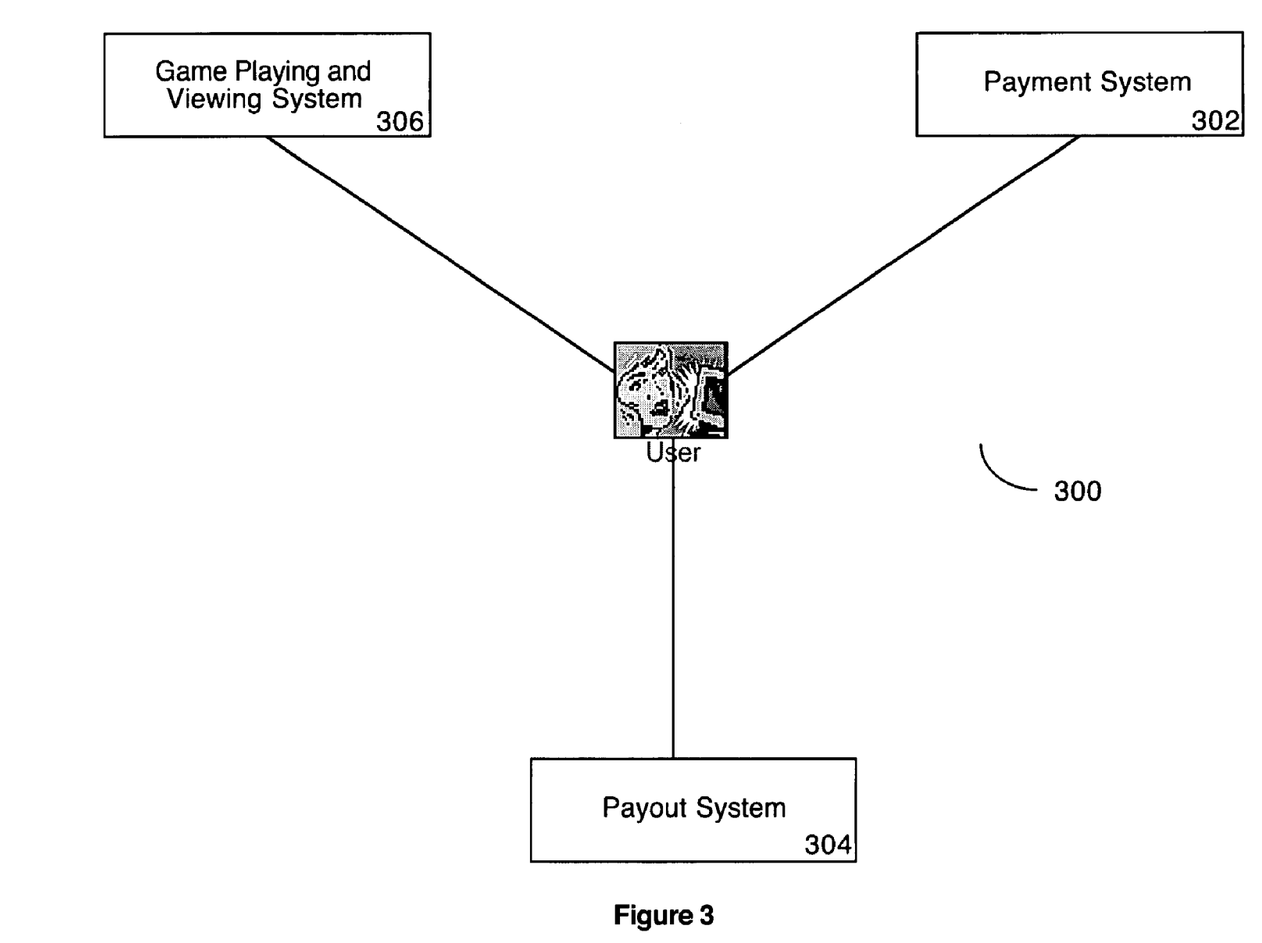
FIG. 3 is an illustrative embodiment of a game computer system upon which various aspects of the present invention may be practiced.
Figure 4:
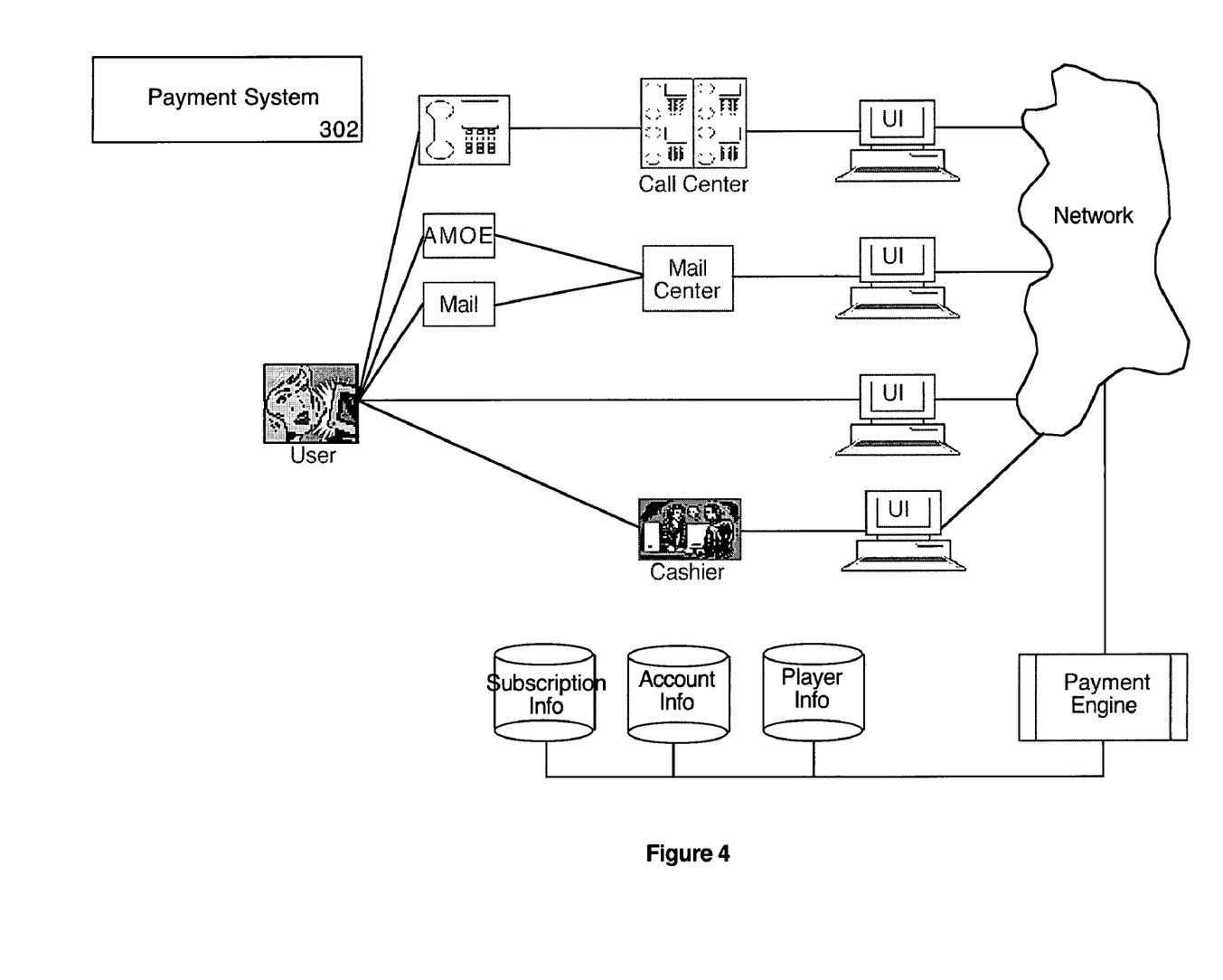
FIG. 4 is an illustrative embodiment of example components of a game payment subsystem according to one embodiment of the present invention.
Figure 5:
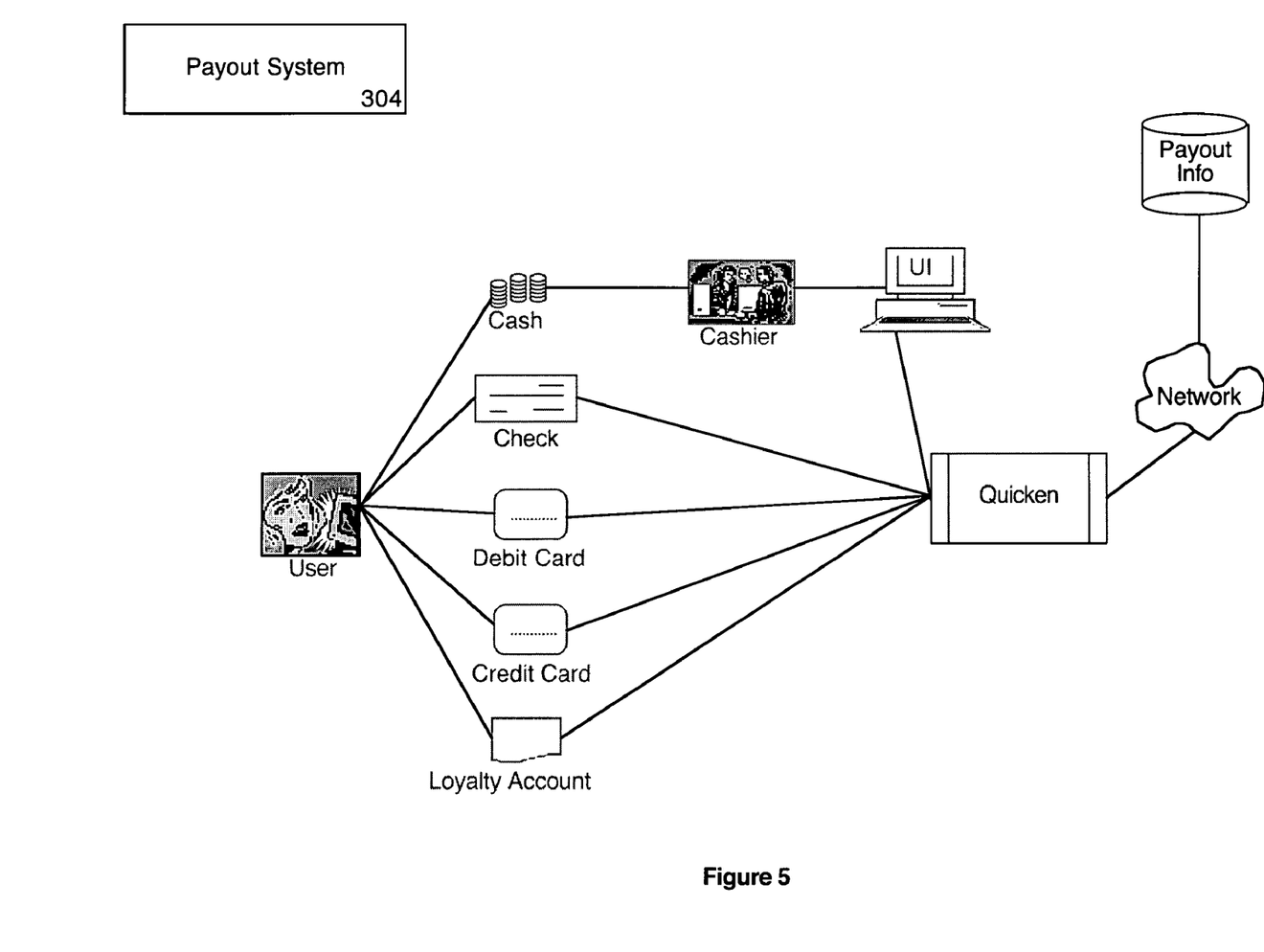
FIG. 5 is an illustrative embodiment of example components of a game payout subsystem according to one embodiment of the present invention.
Figure 6:
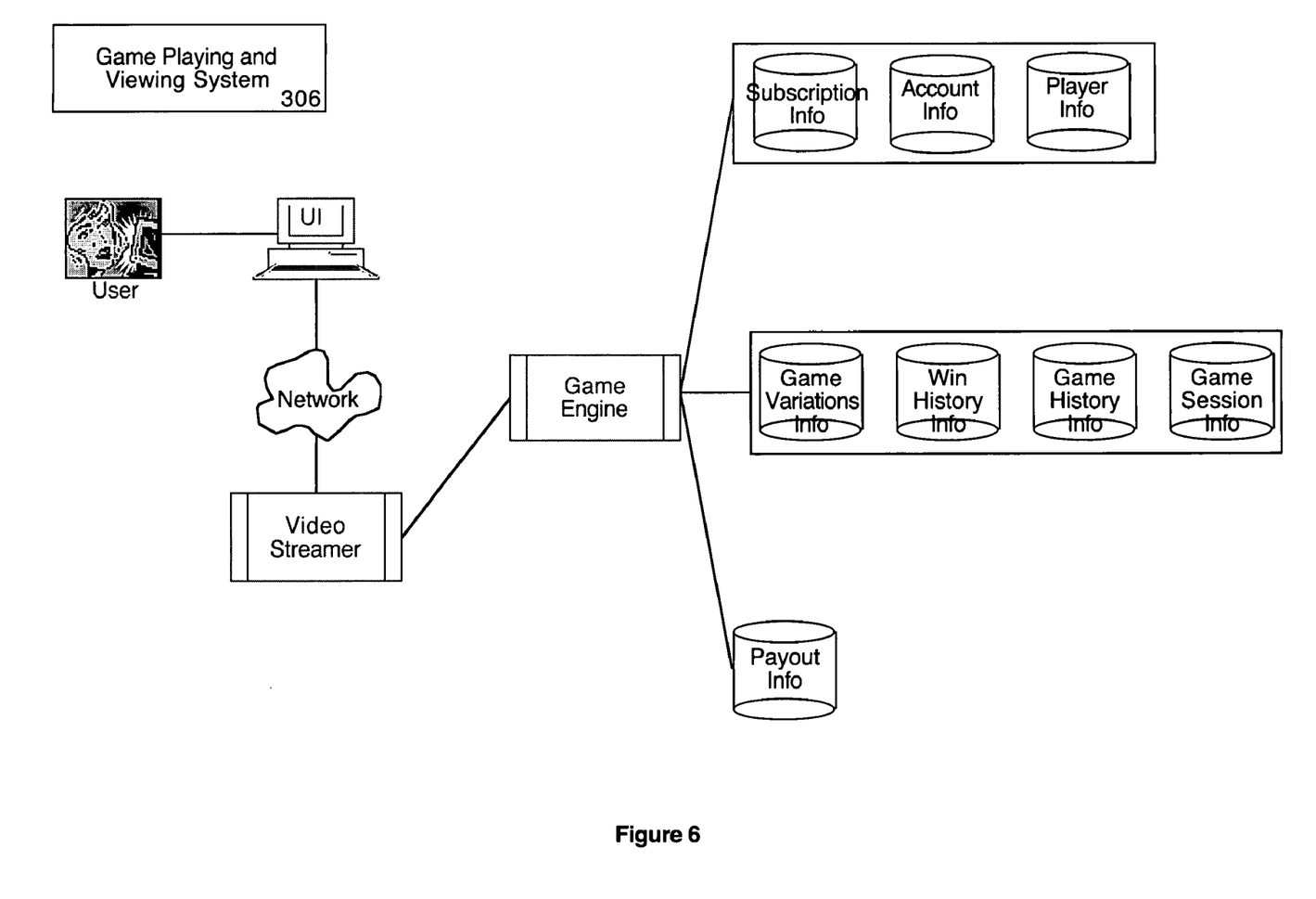
FIG. 6 is an illustrative embodiment of example components of a game playing and viewing subsystem according to one embodiment of the present invention.

A computer system to run the game described above may include one or more component systems (e.g., system 300 as shown in FIG. 3). One system (e.g., item 302 as shown in FIG. 4) may handle payment, subscription, and/or AMOE by players to enter the game. Another system (e.g., item 306 as shown in FIG. 6) may handle playing and viewing the game and another system (e.g., item 305 as shown in FIG. 5) may handle payouts. The game system may also be connected by direct line or network to other computer systems including systems for handling casino or hotel loyalty programs, reservations, in-room television viewing, or gambling floor kiosks. Connections to other computer systems may be performed using one or more of the system components described below.

A payment component (e.g., system 302) may include one or more of a number of well-known systems (e.g., as shown in FIG. 3). For example, a player may be able to pay to play one or more games using a telephone and speaking with a call center representative who manually inputs player, payment, and subscription information into a computer using a user interface. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Types of UIs include a graphical user interface (GUI), a display screen, a mouse, a keyboard, a keypad, a track ball, a microphone (e.g., to be used in conjunction with a voice recognition system), a speaker, a touch screen, a game controller (e.g., a joystick), etc., and any combinations thereof.

Player information may also be entered into a payment system component. Player information that may be input includes name, address, telephone number, and age. Payment information associated with the player may include a credit or debit card number or loyalty account information. Subscription information for games to which the player subscribes may include first game date and time, number of games to play, and bet per game. Based upon the payment and subscription information, the call center representative may then verify that the payment information is valid and that enough credit or funds is available for the player's desired subscription.

A similar system may exist for players entering using the mail or a post card AMOE except the call center may be replaced by a mail center having representatives that enter information into one or more computers via a user interface. For example, a cashier that works at a casino directly with players that pay cash or credit to play, may also have the ability to input player, account, and subscription information using a user interface of a computer system.

Computer systems or pay engines for handling electronic or online payment and subscriptions may also be used. Such systems are well-known, and include such systems as PAYPAL system, IKOBO system, VERISIGN system, and other systems. Using such a system, a player interacts directly with a user interface to input information into a payment data structure that may be transferred to one or more payment systems (e.g., PAYPAL system).

Various pay systems and one or more user interfaces may be located on one or more computer systems coupled by a network with the computer system(s) containing the player, account, and subscription database(s). As used herein, a "network" or a "communications network" is a group of two or more devices interconnected by one or more segments of transmission media (and/or active devices) on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

The above are merely an illustrative embodiment of a pay system component. It should be appreciated that such an illustrative embodiment is not intended to limit the scope of the invention, as any of numerous other implementations of a pay system component, for example, variations of online payment, are possible and are intended to fall within the scope of the invention. For example, the payment system component may include using pay-per-view systems associated with interactive television or the pay engine may additionally deliver a receipt to the player by either e-mail or mail. None of the claims set forth below are intended to be limited to any particular implementation of the pay system unless such claim includes a limitation explicitly reciting a particular implementation.

Payout systems are also well-known. Any of a number of standard systems or payout engines for making payouts for winning may be used. For example, a standard application programming interface such as 'QUICKEN' application (available commercially from Intuit Inc., Mountain View, California, USA) may be used to write and mail checks or credit a debit card, credit card (if legal in the jurisdiction of play) or loyalty account. 'QUICKEN' application may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'QUICKEN' application is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of the pay system unless such claim includes a limitation explicitly reciting a particular implementation.

A game playing and viewing system (e.g., system 306) according to one embodiment of the present invention may comprise of a number of components for performing specific functions as shown in FIG. 5. These components may include, for example, storage components that store data structures having information relating to storing game variations, present game session information, game session history, and win history. A game playing and viewing system may also include components used to access payment and payout data structures.

The game playing and viewing system may also include a game engine. According to one embodiment, the game engine may perform numerous functions, including drawing winning elements for a game session and displaying the drawn winning elements through any communication means, including on a call board on the casino floor, over the Internet (e.g., through a website or internet messaging, or e-mail), or by text messaging on a cell phone. The game playing and viewing system may also receive communication from players indicating a winning keno ticket; communication may be received through any means, including over the Internet (e.g., through a website, internet messaging, or e-mail) or by text messaging on a cell phone.

Acts described above and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, e.g., the computer system described below in relation to FIG. 1, that performs the functions described above can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may be a driver that streams video via a broadband, satellite, or wireless medium to a user interface. If the game is played completely automatically, the user interface may be merely a video terminal including television with no user input means. Viewing access may be controlled by standard means for conditional access including using set top box addresses, telephone numbers or Internet protocol (IP) addresses.

The above is merely an illustrative embodiment of a game playing and viewing system. Such an illustrative embodiment is not intended to limit the scope of the invention, as any of numerous other implementations of a game playing and viewing system, for example, variations of conditional access, are possible and are intended to fall within the scope of the invention. None of the claims set forth below are intended to be limited to any particular implementation of a game playing and viewing system unless such claim includes a limitation explicitly reciting a particular implementation.

System 300, and components thereof such as the payment, payout, and game engines, may be implemented using software (e.g., C, C#, C++, Java, or a combination thereof), hardware (e.g., one or more application-specific integrated circuits), firmware (e.g., electrically-programmed memory), or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 1 and 2.

System 300 is merely an illustrative embodiment of the game system. Such an illustrative embodiment is not intended to limit the scope of the invention, as any of numerous other implementations of the game system, for example, variations of 300, are possible and are intended to fall within the scope of the invention. For example, a parallel system for viewing by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola POWERPC processor, Sun ULTRASPARC processor, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, player chosen elements or elements chosen for the player, drawing winning elements, and communicating with, verifying, and paying winners. It should be appreciated that the system may perform other functions, including network communication, and the invention is not limited to having any particular function or set of functions.

Figure 1:
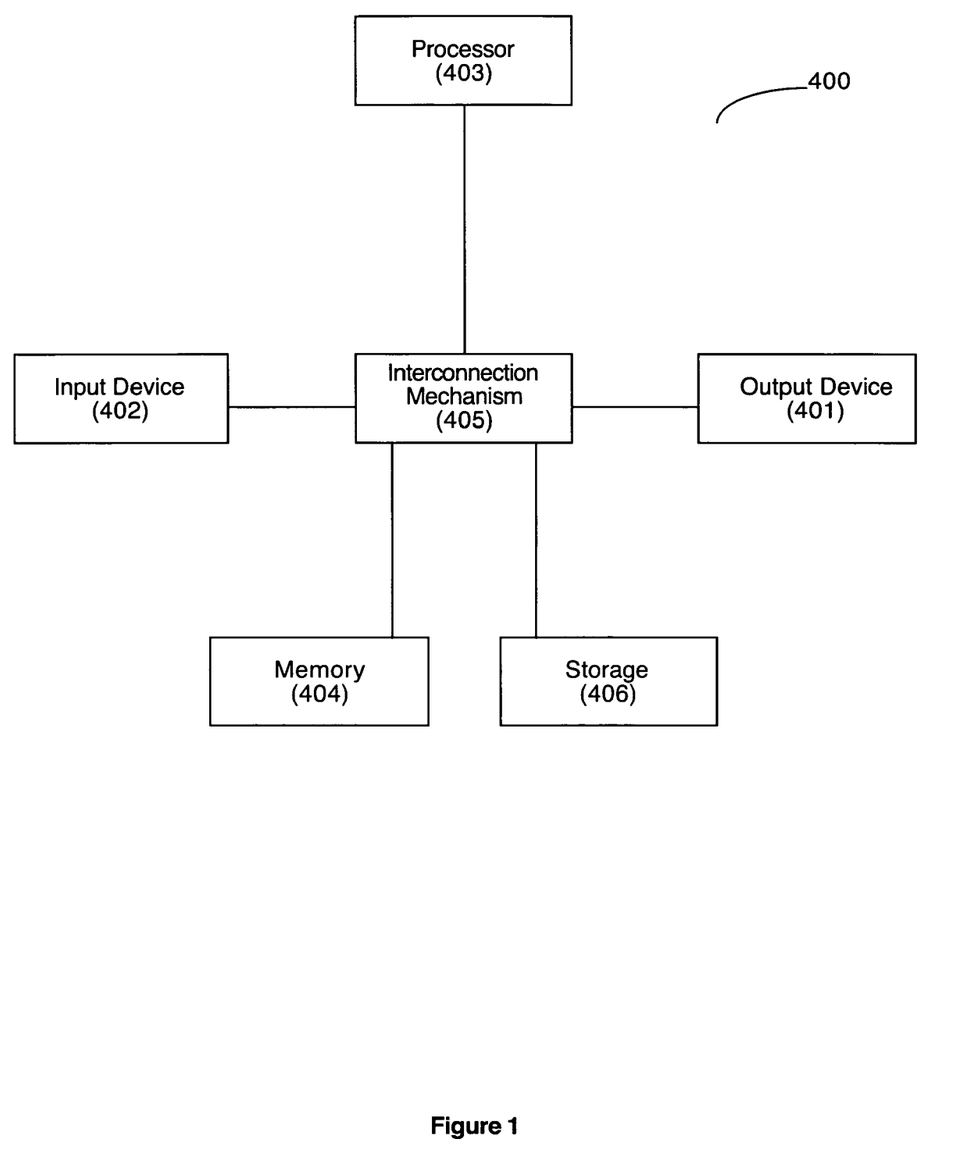
FIG. 1 shows a general-purpose computer system that may be used to implement various aspects of the present invention.

For example, various aspects of the invention may be implemented as specialized software executing in a general-purpose computer system 400 such as that shown in FIG. 1. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, e.g., a printing device, display screen, or speaker. In addition, computer system 400 may contain one or more interfaces (not shown) that connect computer system 400 to a communication network in addition or as an alternative to the interconnection mechanism 405.

Figure 2:
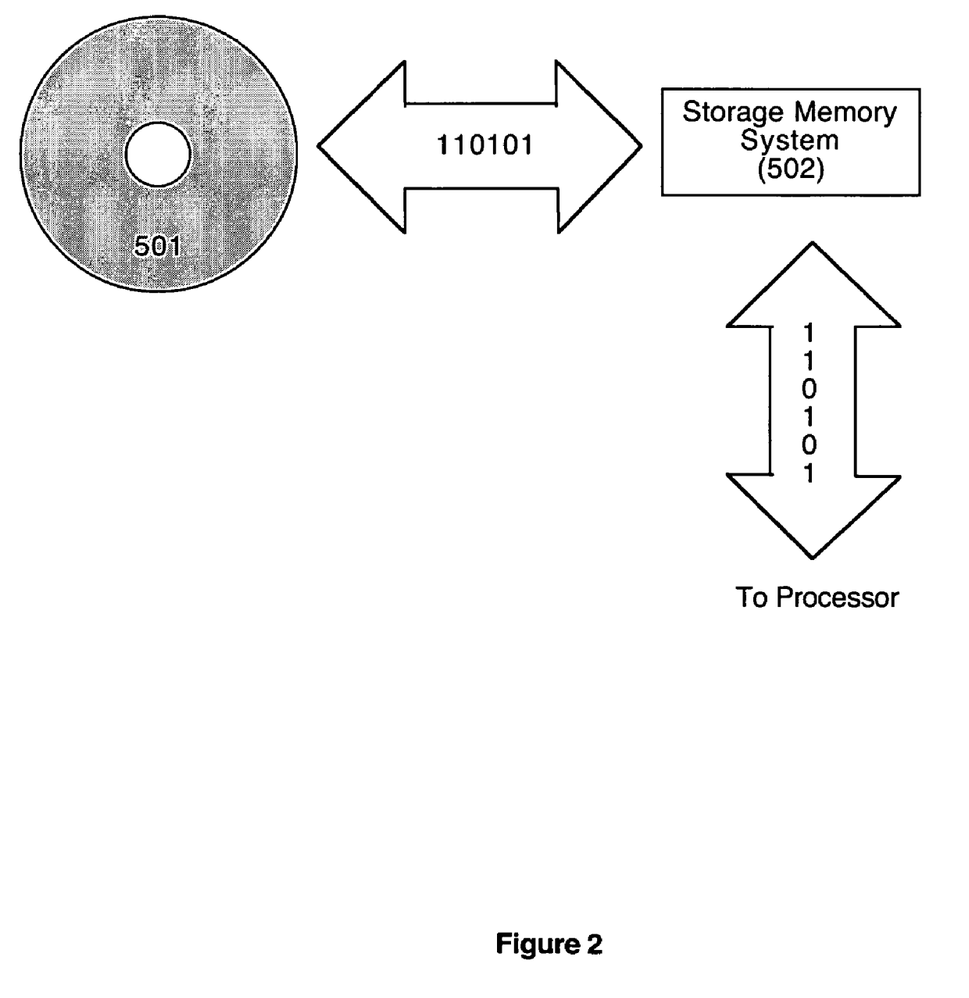
FIG. 2 is an illustrative embodiment of a computer data storage system.

The storage system 406, shown in greater detail in FIG. 2, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404 and 502 and then copies the data to the medium 501 after processing is completed. A variety of mechanisms are known for managing data movement between the medium 501 and the integrated circuit memory element 404 and 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 1. It should be appreciated that various aspects of the invention may be practiced on one or more computers having a different architecture or components than that shown in FIG. 1.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known PENTIUM class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL), or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML, or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for processing a winning keno ticket by a distributed computer system comprising acts of:
    issuing, at a Point of Sale (POS), a keno ticket responsive to a player making a purchase of the keno ticket at the POS;
    permitting the player to play a keno game associated with the issued ticket at a remote location from the POS;
    indicating to the player that the keno ticket is the winning ticket;
    providing for the player to redeem the winning keno ticket using electronic communication between the player and the gaming operator using the distributed computer system;
    determining, by the distributed computer system, a time that the player redeems the winning keno ticket and determining if the player redeems the winning keno ticket within a predetermined redemption period;
    if it is determined by the distributed computer system that the winning keno ticket was redeemed within the predetermined redemption period, charging, automatically by the distributed computer system at the time of redemption, the gaming operator a first tax rate; and
    if it is determined by the distributed computer system that the winning keno ticket was redeemed outside of the predetermined redemption period, charging, automatically by the distributed computer system at the time of redemption, the gaming operator a second tax rate.

2. The method according to claim 1, wherein the electronic communication is performed using the Internet.

3. The method according to claim 1, wherein the electronic communication is performed using e-mail.

4. The method according to claim 1, wherein the electronic communication is performed using instant messaging on the Internet.

5. The method according to claim 1, wherein the electronic communication is performed using text messaging.

6. The method according to claim 1, wherein the game operator is a land-based casino.

7. The method according to claim 1, wherein the game operator is at least one of a state lottery and a national lottery.

8. A computer-based keno game comprising:
    a plurality of tickets purchased by a plurality of players at a Point of Sale (POS) responsive to the respective players making purchases of the plurality of tickets at the POS;
    at least one winning ticket of the plurality of tickets;
    a game play interface through which at least one player of the plurality of players plays the game and receives an indication that the at least one player purchased the at least one winning ticket; and
    an electronic communication means for a player to redeem the winning ticket;
    an electronic means for determining a time that the at least one player redeems the winning keno ticket and determining if the at least one player redeems the winning keno ticket within a predetermined redemption period; and
    an electronic means for charging the gaming operator automatically at the time of redemption, a first tax rate responsive to a determination that the winning keno ticket was redeemed within the predetermined redemption period, and a second tax rate responsive to a determination that the winning keno ticket was redeemed outside of the predetermined redemption period.

9. A game according to claim 8, wherein the electronic communication means is over the Internet.

10. The game according to claim 8, wherein the electronic communication means is by e-mail.

11. The game according to claim 8, wherein the electronic communication is by instant messaging on the Internet.

12. The game according to claim 8, wherein the electronic communication is by text messaging.

13. The game according to claim 8, wherein the game operator is a land-based casino.

14. The game according to claim 8, wherein the game operator is at least one of a state and a national lottery.

* * * * *